United States Patent [19]
Barer et al.

[11] 3,920,844
[45] Nov. 18, 1975

[54] CHLORINATED DIAROMATIC-SUBSTITUTED AMINOALKANES AS FUNGICIDES AND INSECTICIDES

[75] Inventors: Sol J. Barer, Plainsborough; Peter C. Valenti, East Windsor, both of N.J.

[73] Assignee: National Patent Development Corporation, New York, N.Y.

[22] Filed: June 10, 1974

[21] Appl. No.: 477,961

[52] U.S. Cl. ............................................. 424/330
[51] Int. Cl.$^2$ ........................ A01N 9/20; A01N 9/24
[58] Field of Search ................ 424/330; 260/570 R

[56] References Cited
UNITED STATES PATENTS

| | | | |
|---|---|---|---|
| 3,397,272 | 8/1968 | Doebel et al. | 424/330 |
| 3,446,901 | 5/1969 | Jones et al. | 424/330 |
| 3,471,612 | 10/1969 | Goonewardene | 424/330 |

Primary Examiner—Albert T. Meyers
Assistant Examiner—D. W. Robinson
Attorney, Agent, or Firm—Cushman, Darby & Cushman

[57] ABSTRACT

N-haloaminodiarylalkanes, N-haloaminodiarylhaloalkanes, and N-haloaminodi(haloaryl)alkanes have been found to have fungicidal and insecticidal activity.

18 Claims, No Drawings

CHLORINATED DIAROMATIC-SUBSTITUTED AMINOALKANES AS FUNGICIDES AND INSECTICIDES

The present invention relates to the use of N-haloaminodiarylalkanes and N-haloaminodiarylhaloalkanes as well as corresponding compounds also having ring halogen as fungicides and insecticides. They have been found particularly effective as foliar fungicides, systemic fungicides, insecticides and insect growth regulants.

The use of fungicides in agriculture is necessitated by the great losses of crops caused by fungi. Approximately $3 billion dollars annually are lost due to plant pathogenic fungi, in the United States alone. The cost of fungicide treatments is many times recovered by the increased yields obtained.

Insecticides are vitally important both in agriculture where protection against insect pests is mandatory, as well as for health purposes, e.g., against the yellow fever mosquitos.

Thousands of compounds are screened annually in the search for fungicidally effective compounds. Today many fungicides are commercially available for specific fungi, e.g., Benlate (methyl 1-(butyl carbamoyl)-2-benzimidazole carbamate) for powdery mildew, Karathane (2-(1-Methyl-heptyl)-4, 6-dinitro phenyl crotonate) for powdery mildew and Dithane S-31 (Nickel sulfate and manganous ethylenebis(dithiocarbamate) for rust on cereal grains and grasses. The specificity of many of the available fungicides increases the costs and frequency of applications as well as complicating their application.

The insecticides in use today rarely have any fungicidal activity; moreover, they are very often highly toxic chemicals (e.g., Parathion (O,O-diethyl O-p-nitrophenyl phosphorothioate), $LD_{50} = 6–15$) and can be quite unstable, (e.g., Abate (O,O,O′O′-tetramethyl O,O′-thiodi-p-phenylene phosphorothioate)).

Insect growth regulants are a relatively new class of biologically active molecules. Their synthesis is painstaking and they usually possess very specific activity.

N-chloroaminodiarylalkanes and other compounds suitable in the practice of the invention have been found to possess unique biological activity. They are foliar as well as systemic fungicides (against a broad range of pathogenic fungi) as well as exhibiting insecticidal and insect growth regulant activity. Their structural characteristics permit a wide range of structural modification which can be accomplished using conventional means of chemical synthesis.

The N-halo compounds suitable in the practice of the invention have the formula (I):

I
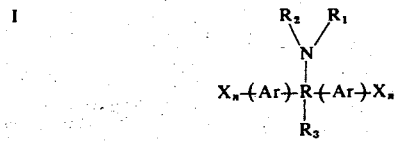

where R is an aliphatic hydrocarbon group of 1 to 20 carbon atoms, most preferably 1 carbon atoms; Ar is a mono or polyaromatic hydrocarbon ring including fused and bridged aromatic ring structures, e.g., the phenyl, naphthyl or biphenyl group, preferably phenyl; $R_1$ is halogen, preferably chlorine; $R_2$ is hydrogen, halogen, or alkyl, e.g., alkyl of 1 to 20 carbons, and is preferably hydrogen, chlorine or alkyl of 1 to 4 carbon atoms, most preferably chlorine; $R_3$ is hydrogen, alkyl, e.g., of 1 to 20 carbon atoms or haloalkyl, e.g., of 1 to 20 carbon atoms, preferably hydrogen, alkyl of 1 to 4 carbon atoms or chloroalkyl of 1 to 4 carbon atoms; X is halogen, preferably chlorine; and $n$ is an integer from 0 to 3. The aromatic rings can also have alkyl groups, e.g., of 1 to 5 carbon atoms.

The compounds desirably have 2 to 8 halogen atoms, more preferably 2 to 6 chlorine atoms. The halogens in the N-halo compound have atomic numbers of 17 to 53 inclusive.

Typical examples of compounds which can be used in the present invention as fungicides and insecticides (including insect growth regulants) are N,N-dichloroaminodiphenylmethane, N,N-dichloro-1,3-diphenylisopropylamine, N,N-dichloro1,7-diphenyl-4-aminoheptane; N,N-dichloro-1,20-diphenyl-9-aminoeicosane; N,N-dichloro-1,3-di-p-chlorophenylisopropylamine; N,N-dichloro-2,2-diphenylethylamine; N,N-dichloro-2,2-di(p-chlorophenyl)ethylamine; N-chloro-N-methyl-2,2-diphenylethylamine; N-chloro-N-ethyl-2,2-di(o-chlorophenyl)ethylamine; N,N-dichloro-2-(p-chlorophenyl)-2-phenylethylamine; N,N-dichloro-3,3-diphenylpropylamine; N,N-dichloro-4,4-diphenylbutylamine; N,N-dichloro-5,5-diphenylamylamine; N-chloro-N-methylaminodiphenylmethane; N-chloro-N-methylaminodi(p-chlorophenyl)methane; N-bromoaminodiphenylmethane; N-chloro-N-ethylamino-di(p-chlorophenyl)methane; N-chloro-N-butylamino-di(p-chlorophenyl)methane; N-chloro-N-octadecylamino-di(p-chlorophenyl)methane; N-chloro-N-eicosanylamino-di(p-chlorophenyl)methane; N,N-dichloroamino-di(p-chlorophenyl) methane; N,N-dichloroamino-di(o-chlorophenyl)methane; N,N-dichloroamino-di(m-chlorophenyl)methane; N,N-dichloroaminodi(p-bromophenyl)methane; N,N-dichloroamino-di(p-fluorophenyl) methane; N,N-dichloroamino-di(2,4-dichlorophenyl)methane; N,N-dichloroamino-di(2-methyl-4-chloro-phenyl)methane; N,N-dichloroamino-di(2-chloro-4-methylphenyl)methane; N,N-dichloroamino-di(p-tolyl)methane; N,N-dichloroamino-di(p-t-butyl-phenyl)methane; N,N-dichloroamino-di(biphenyl)methane; N,N-dichloroamino-di(alpha-naphthyl)methane; N,N-dichloroaminodi(beta-naphthy)methane; 1-(N,N-dichloroamino)-1,1-diphenylethane (also called Dichloroamin-M or methyl-diphenylmethyldichloramin) 1-(N,N-dichloroamino)-1,1-di(p-chlorophenyl) ethane; 1-(N,N-dichloroamino)-1,1-diphenyl-2-chloroethane; 1-(N,N-dichloroamino)-1,1-diphenyl-2,2,2-trichloroethane; 1-(N,N-dichloroamino)-1,1-di(p-chlorophenyl)-2,2,2-trichloroethane; 1-(N,N-dibromoamino)-1,1-di(p-chloropheny)-2,2,2-trichloroethane; 1-(N,N-dichloroamino)-1,1-di(p-bromophenyl)-2,2,2-trichloroethane; 1(N-chloro-N-isopropylamino)-1,1-di(p-chlorophenyl)ethane; 1-(N,N-dichloramino)-1,1-diphenylpropane; 1-(N,N-dichloroamino)-1,1-di(p-chlorophenyl)propane; 1-(N,N-dichloroamino)-1,1-diphenylbutane; 1-(N,N-dichloroamino)-1,1-diphenylpentane; 1-(N,N-dichloroamino)-1,1-diphenyleicosane; 1-(N,N-dichloroamino)-1,1-di(p-chlorophenyl)eicosane; 1-(N,N-dichloroamino)-1,1-diphenyl-3,4-dichlorobutane; N,N-dichloroamino-di(2,4,5-trichlorophenyl)methane.

The N-halo compounds of the present invention can be prepared in conventional fashions for example by the procedures disclosed in Vosburg, J. Am. Chem. Soc. (1916) pages 2081–2095 and Morgan, J. Amer. Chem. Soc. (1916), pages 2095–2101, or the N-halo compounds can be prepared by reacting the corresponding compounds of Formula I wherein $R_1$ and $R_2$ are not chlorine and at least one is hydrogen with an N-halogenating agent, e.g., with a compound having the formula ROX wherein R is an alkyl or cycloalkyl group thereby replacing one or more of the amino hydrogen atoms of Formula I with X (halogen), the by-product being ROH. Illustrative ROX compounds include t-butyl hypochlorite, t-butyl hypobromite, t-butyl hypoiodite, t-amyl hypochlorite, 1-methylcyclopentyl hypochlorite, 1-methylcyclopentyl hypobromite, 1-methylcyclohexyl hypochlorite, n-propyl hypochlorite, isopropyl hypochlorite, ethyl hypochlorite, n-butyl hypochlorite, n-amyl hypochlorite, n-propyl hypobromite, n-hexyl hypochlorite, sec.-butyl hypochlorite, and n-octyl hypochlorite. There can also be used inorganic hypohalites such as sodium hypochlorite, potassium hypochlorite, lithium hypochlorite, sodium hypobromite, sodium hypoiodite and calcium hypochlorite.

The preferred reaction procedure employs hypohalites of the formula ROX, preferably t-alkyl hypochlorites. The reaction is carried out conveniently at a temperature of about −30°C. to about +30°C., preferably 0°C ± 5°C., at atmospheric pressure in an inert organic medium, that is, inert under the reaction condition with the reactants and product. Illustrative inert organic media include esters such as methyl acetate, ethyl acetate, propyl acetate, methyl acetate, methyl pivalate, and butyl pivalate; halohydrocarbons, e.g., methylene chloride, carbon tetrachloride, chloroform, ethylene dichloride, trimethylene chloride, ethyl chloride, butyl chloride, isopropyl chloride, and amyl chloride; alcohols, e.g., methanol, ethanol, isopropanol, butanol, pentanol, hexanol, cyclohexanol, isooctyl alcohol, ethylene glycol, propylene glycol, trimethylene glycol, glycerine, diethylene glycol and dipropylene glycol, While operative temperatures above 30°C. can be employed, they are not preferred because of the tendency of the hypohalites to become unstable at elevated temperatures.

Illustrative inert liquid diluents include water and inert organic vehicles as carriers, e.g., hydrocarbons such as benzene, toluene, xylene, kerosene, diesel oil, fuel oil, and petroleum naphtha; ketones such as acetone, methyl ethyl ketone, and cyclohexanone; chlorinated hydrocarbons such as carbon tetrachloride, chloroform, trichloroethylene and perchloroethylene; esters such as ethyl acetate, amyl acetate and butyl acetate; alcohols, e.g., ethanol, methanol, isopropanol, amyl alcohol, ethylene glycol, propylene glycol, and glycerine. Mixtures of water and organic vehicle, either as solutions or emulsions, can be employed.

The N-halo compounds, alone or as formulations, can also be applied as aerosols, e.g., by dispersing them in air by means of a compressed gas such as dichlorodifluoromethane or trichlorofluoromethane and similar halogenated alkanes.

In a particular desirable embodiment, the N-halo compounds are admixed with or impregnated on various inert solid carriers which can be directly applied in the contemplated agricultural use, or they can be further admixed with an inert liquid diluent with/without additional ingredients, e.g., surface active agent, etc., and thereafter utilized in the contemplated agricultural application. By the term "inert" is meant that the N-halo compound and carrier and/or liquid diluent are substantially non-reactive towards each other. Additionally, it has been observed that various inert carriers are capable of enhancing the stability of the N-halo compound over prolonged periods of time. Illustrative of such carriers include the alkali metal and alkaline earth metal borates, the precipitated hydrated silicon dioxides (HiSil 404), hydrous calcium silicates such as those made by the hydrothermal reaction of diatomaceous earth, hydrated lime, and water (Microcel C and Microcel E), and the like.

The N-halo compounds can also be applied with adjuvants or carriers such as talc, pyrophyllite, synthetic fine silica, attapulgite clay (attaclay), kieselguhr, chalk, diatomaceous earth, lime, calcium carbonate, bentonite, fuller's earth, cottonseed hulls, wheat flour, soybean flour pumice, tripoli, wood flour, walnut shell flour, redwood flour, and lignin.

Solid formulations comprising an inert carrier can be prepared in which the concentration of the ingredients vary over a considerably wide range, e.g., from about 5 to about 80 weight percent of said N-halo compound based on the total weight of said N-halo compound and said carrier. Optimum results and enhanced stability of said N-halo compound have been observed using approximately 20 to about 40 weight percent of said N-halo compound based on the total weight of said N-halo compound and said carrier.

It is frequently desirable to incorporate a surface active agent in the compositions of the present invention. Such surface active or wetting agents are advantageously employed in both the solid and liquid compositions. The surface active agent can be anionic, cationic or nonionic in character. When a surface active agent is present, it is usually employed in an amount of 0.05 – 1 percent by weight.

Typical classes of surface active agents include alkyl sulfonate salts, alkylaryl sulfonate salts, alkylaryl polyether alcohols, fatty acid esters of polyhydric alcohols and the alkylene oxide addition products of such esters and addition products of long chain mercaptans and alkylene oxides. Typical examples of such surface active agents include the sodium alkylbenzene sulfonates having 10 to 18 carbon atoms in the alkyl group, alkylphenyl ethylene oxide condensation products, e.g., p-isooctylphenol condensed with 10 ethylene oxide units, soaps, e.g., sodium stearate and potassium oleate, sodium salt of propylnaphthalene sulfonic acid, di(2-ethylhexyl) ester of sodium sulfosuccinic acid, sodium lauryl sulfate, sodium decane sulfonate, sodium salt of the sulfonated monoglyceride of coconut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g., Ethofat 7 and 13, sodum N--methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide propylene oxide condensation products, e.g., Pluronic 61 (molecular weight 1000), polyethylene glycol ester of tall oil acids, sodium octyl phenoxyethoxyethyl sulfate, tris(polyoxyethylene) sorbitan monostearate (Tween 60), and sodium dihexyl sulfosuccinate.

The active ingredient per se or the active ingredient contained in a solution, dispersion, emulsion, suspension can be prepared via conventional techniques well known to the art.

The N-halo compounds or formulations containing same can also be admixed with hydrophilic polymers, either of the water soluble or the water insoluble type. Thus for controlled release of the fungicide and insecticide of the present invention it can be entrapped in a hydrophilic polymer, e.g., in the form of a powder in the manner shown for medicines, flavors, fragrances, etc., in Shepherd U.S. Pat. No. 3,618,213. As hydrophilic polymers there can be used water insoluble polymers of water soluble hydroxyalkyl acrylates and methacrylates such as hydroxyethyl acrylate, hydroxypropyl acrylate, hydroxyethyl methacrylate, hydroxypropyl methacrylate, diethylene glycol monoacrylate, diethylene glycol monomethacrylate, dipropylene glycol monoacrylate, dipropylene glycol monomethacrylate or polymers of acrylamide, methacrylamide, vinyl pyrrolidone, and copolymers with polyethylenically unsaturated cross linking agents such as ethylene glycol dimethacrylate, ethylene glycol diacrylate, propylene glycol diacrylate, propylene glycol dimethacrylate, butylene dimethacrylate, divinyl benzene, triallyl melamine, N,N'-methylene bisacrylamide, pentaallyl sucrose, diallyl itaconate, allyl maleate, divinyl ether and others such as any of those set forth in Shepherd U.S. Pat. No. 3,575,123, col. 3, lines 15–35 for example. The cross linking agent can be present in an amount of 0.05 to 15 percent and upward to about 20 percent, usually 0.1 to 2.5 percent of the hydrophilic monomer.

There can also be included ethylenically unsaturated acids or salts thereof such as acrylic acid, cinnamic acid, methacrylic acid, itaconic acid, fumeric acid, maleic acid or partial esters such as 2-hydroxypropyl itaconate, 2-hydroxypropyl itaconate, 2-hydroxyethyl maleate, etc. There can also be used any of the other copolymerizable monomers set forth in the Shepherd patent the entire disclosure of which is hereby incorporated by reference.

The novel compounds of the present invention can also be entrapped in water soluble hydrophilic homopolymers, e.g., polyvinylpyrrolidone, polyacrylamide or polymethacrylamide, or water soluble copolymers of these materials with hydroxyethyl acrylate, hydroxyethyl methacrylate, hydroxypropyl acrylate, hydroxyporpyl methacrylate, as well as any of water soluble hydrophilic copolymers set forth in Gould U.S. Pat. No. 3,576,760, the entire disclosure of which is incorporated by reference. Thus the procedure of Gould Example 22 can be used replacing the 2,4-dichlorophenoxyacetic acid by one gram of N,N-dichloroaminodiphenylmethane.

The N-halo compounds can also be incorporated in photodegradable polymers such as polyethylene, polypropylene, polybutene or copolymers such as ethylene-propylene copolymers which are applied as agricultural mulches and used in insecticidal applications and fungicidal applications. Typical examples of suitable photodegradable polymer compositions include those set forth in Shepherd U.S. Pat. No. 3,590,528, Newland U.S. Pat. No. 3,592,792, Field U.S. Pat. No. 3,341,357, Moore U.S. Pat. No. 3,320,695, Newland U.S. Pat. No. 3,454,570 and German Offenlegungsschrift No. 2,158,379.

Additionally, the insectidies and fungicides can be admixed with biodegradable polymers, e.g., thermoplastic polycaprolactones.

The solid and liquid N-halo compound containing formulations can be applied to soil, growing plants, e.g., trees, cotton plants, wheat and other grain plants, vegetable plants, seeds, fabrics, etc., to give fungicidal and/or insecticidal protection.

The N-halo compounds are employed in a fungicidally or insecticidally (hereinafter termed "biocidally") effective amount. In general, such compounds can be employed at widely varying rates, e.g., 0.1 to 100 lbs/acre, usually 0.5 to 30 lbs/acre. As fungicides, they are usually employed at a dosage of 0.1 to 20 lbs./acre. As insecticides, they are normally used in a dosage of 0.2 to 10 lbs/acre. Of course, when the compounds are used as fungicides or insecticides on growing crops, e.g., wheat, cotton, barley, soybeans, corn, oats, turnips, tomatoes, beans, peas, carrots, broccoli, beets, trees, etc., they should not be used in an amount to kill the plants. The compounds also can be applied to seeds, or fabrics, etc., as fungicides, or insecticides.

The N-halo compounds can be prepared by the method of Examples 2 and 3 below. The precursors are well-known. They can be synthesized, for instance, as shown in Example 1 below. Typical examples of suitable precursors used in the preparation of the N-halo compounds are set forth in U.S. Pat. Nos. 3,471,612, 3,510,560, 3,152,173 as well as Chem. Abst. Vol. 45, page 1728 (articles by Ogata et al); Chem. Abst. Vol. 64, page 17453 (articles by Kalaman et al).

Unless otherwise indicated, all parts and percentages are by weight.

EXAMPLE 1

4,4'-Dichloroaminodiphenylmethane

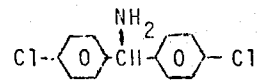

4,4'-Dichlorobenzophenone (50 grams; 0.2 mole) and of ammonium formate (50 grams; 0.79 mole) were added to a 250 ml round bottom flask equipped with a magnetic stirrer, claisenhead, thermometer, dean stark trap and a reflux condenser. The mixture was heated to 165°C. and stirred for 24 hours. The solution was allowed to cool to approximately 100°C. and 50 ml of concentrated HCl added. The solution was then refluxed for approximately four hours. 200 ml of benzene was added to the slurry and the solution made basic with concentrated NH$_4$OH. The solid disappeared and the benzene layer was washed with water until neutral to litmus, dried and the benzene evaporated on a rotary evaporator. There was obtained a waxy solid which was recrystallized from absolute ether. The yield was 50 percent (25 grams). The melting point 61.5°–64°C., elemental analysis for C, H, N, and Cl, and infrared spectrum were consistent with the assigned compound.

EXAMPLE 2

N,N-Dichloroaminodiphenylmethane

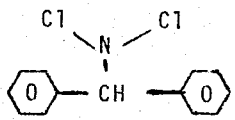

581 Grams (3.17 moles) of distilled aminodiphenylmethane was added to 2.5 liters of methanol contained in a 3-necked round bottom flask under nitrogen. An addition funnel, filled with 758.4 ml (7 moles) of t-butyl hypochlorite, was connected to the flask. The resulting mixture was cooled to 5°C. and the t-butyl hypochlorite was added over a one hour period. The resulting solution was allowed to stir for 2 hours and come to room temperature. The solution was then cooled to 0°C., the resulting precipitate was recovered via filtration, and dried. There was obtained 686.4 grams of N,N-dichloroaminodiphenylmethane whose structure was confirmed by $KI/Na_2S_2O_3$ titration, elemental analysis for C, H, N, and Cl, and infrared spectrum. The yield was 86 percent.

EXAMPLE 3

N,N-Dichloro-4,4'-dichloroamino-diphenylmethane

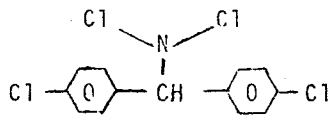

4,4-Dichloroaminodiphenylmethane (1 mole) was reacted with t-butyl hypochlorite (2.5 moles) in the manner and under the conditions set out in Example 2 supra. There was obtained, in 89 percent yield, a solid product identified as N,N-dichloro-4,4'-dichloroaminodiphenylmethane by $KI/Na_2S_2O_3$ titration, elemental analysis for C, H, N, and Cl, and infrared spectrum.

In the fungicidal tests below the N-halo compounds were dissolved in 15 ml of methanol containing 125 mg of Igepon AP78 (coconut oil ester of sodium isothionate) as a wetting agent and 175 mg of Marasperse N$^{-22}$ (sodium lignin sulfonate) as a dispersing agent. The mixture was diluted with water to get the proper concentration for the indicated application rate in lbs/acre.

Fungicidal and insecticidal activities reported below were obtained employing the following general test procedures.

TEST PROCEDURE FOR PROTECTANT AND FUNGICIDAL ACTIVITY AGAINST LATE BLIGHT OF TOMATOES, Phytophora infestans Bonny Best tomato plants, Lycopersicon esculentum, approximately five to six weeks old, in five-leaf growth stage, are mounted on a compound turntable and sprayed at 30 pounds pressure with the candidate compound at concentration indicated. Samples are prepared for spraying by dissolving in a suitable solvent (e.g., methyl alcohol) and diluting to desired concentrations with deionized water containing wetting and dispersing agents.

After drying, treated plants are spray-inoculated with a mixed sporangial and zoospore suspension of Phytopthora infestans and immediately placed in an incubation chamber maintained at 70°F and 95 percent plus RH. After 40 hours in the incubation chamber, plants are removed and observed for total infection lesions of the top three leaves. Effectiveness of treatments is determined by direct comparison with inoculated controls. Maneb is used as a reference standard. All units of test include a minimum of three replicates.

TEST procedure FOR PROTECTANT FUNGICIDAL ACTIVITY AGAINST RICE BLAST DISEASE, Piricularia oryzae Rice plants in fully developed second-leaf growth stage are mounted on a compound turntable and sprayed at 40 pounds pressure for 60 seconds with the candidate compound at concentrations indicated. Approximately 150 ml of test solution are delivered. Candidate samples are prepared for spraying by dissolving in a suitable solvent (e.g., methyl alcohol) and diluting to desired concentration with deionized water containing wetting and dispersing agents.

After drying, treated plants are spray-inoculated at 30 pounds pressure with an aqueous spore suspension of Piricularia oryzae and then immediately placed in an incubation chamber maintained at 70°F and 95percent plus RH. After proper incubation time plants are removed to the greenhouse for disease development. Infection lesions are sufficiently developed within five days after inoculation to permit assessment of control. Disease severity is determined by actual count of the number of infection lesions developing on untreated inoculated controls. Effectiveness of treatment is determined by direct comparison of the number of infection lesions appearing on the respective treated plants compared directly with those lesions appearing on untreated inoculated controls. PMA is used as a reference standard. All units of test include a minimum of three replicates.

TEST PROCEDURE FOR PROTECTANT FUNGICIDAL ACTIVITY AGAINST POWDERY MILDEW OF CUCUMBERS, Erysiphe cichoracearum Candidate compounds are prepared for spraying by dissolving in a suitable solvent (e.g., methyl alcohol) and diluting to desired concentration with deionized water containing wetting and dispersing agents.

Straight-eight cucumber (Cumcumis sativas) plants in first true leaf stage, approximately 14 to 18 days old, grown under greenhouse conditions, are mounted on a compound turntable and sprayed to incipient run off at 30 psi with candidate compound at concentration indicated, using 30 ml of the spray solution per five replicates (equivalent to approximately 200 gpa).

After treated plants have dried, they are placed among diseased Erysiphe cichoracearum cucumber plants according to the pattern below, subjected to an initial spore shower by dusting with spores from diseased plants and then left undisturbed in place for approximately ten days. By this procedure treated plants are subjected to the cited initial spore shower as well as to continuing natural infection pressure from surrounding inoculum. Observations ten days after initial inoculation determine effectiveness of treatments. Untreated controls will generally reflect 75 to 100 percent leaf area diseased at this time. Effectiveness of treatment is determined by direct comparison of the average percentage leaf area infection on treated plants with the average percentage leaf area infection on untreated inoculated control. Karathane is used as a reference standard.

TEST PROCEDURE FOR PROTECTANT FUNGICIDAL ACTIVITY AGAINST LEAF RUST OF WHEAT, Puccinia rubigo-vera Cheyenne wheat plants, *Triticum vulgare*, approximately seven to eight days old and four to five inches tall are mounted on a compound turntable and sprayed at 40 pounds pressure for 60 seconds with respective candidate compounds at concentrations indicated. Candidate compounds are prepared for spraying by dissolving in a suitable solvent system, e.g., methyl alcohol and diluting to desired concentration with deionized water containing wetting and dispersing agents.

After drying, treated plants are dusted with spores of *Puccinia rubigo-vera* directly from diseased plants and then immediately placed in an incubation chamber maintained at 70°F and 95 percent plus RH. After the proper incubation period, plants are removed to the greenhouse for disease development.

Disease severity (infection pressure) is determined by actual count of developed pustules on inoculated but otherwise untreated controls. Control effectiveness is determined by actual count of the number of developed pustules appearing in the respective treatments compared directly to equivalent developed pustules developing on inoculated but otherwise untreated controls. Maneb is used as a reference standard. All units of test include a minimum of three replicates.

TEST PROCEDURE FOR PROTECTANT FUNGICIDAL ACTIVITY AGAINST BACTERIAL LEAF SPOT OF TOMATOES, Xanthomonas vesicatoria Bonny Best tomato plants approximately six to seven weeks old, in six to seven-leaf growth stage, are mounted on a compound turntable and sprayed at 35 pound pressure for 50 seconds with the candidate compound as concentrations indicated. Approximately 150 ml of test solution is delivered. Candidate samples are prepared for spraying by dissolving in a suitable solvent (e.g., methyl alcohol) and diluting to desired concentration with deionized water containing wetting and dispersing agents.

After drying, treated plants are spray-inoculated at 30 pounds pressure with an aqueous cell suspension of *Xanthomonas vesicatoria* containing five percent Carborundum and then immediately placed in an incubation chamber maintained at 70°F and 95 percent plus RH. After 40 hours in the incubation chamber, plants are removed to the greenhouse for further development of infection lesions. Disease severity is determined by count of lesions persent on six to seven treated leaves. Effectiveness of treatment is determined by direct comparison with inoculated controls. Streptomycin sulfate is used as a reference standard.

TEST PROCEDURE FOR SYSTEMIC PROTECTANT FUNGICIDAL ACTIVITY AGAINST POWDERY MILDEW OF CUCUMBERS, Erysiphe cichoracearum Straight-eight cucumber plants in first true leaf stage, approximately 14–18 days old, are used as host plants. Candidate compounds dissolved in a suitable solvent system, e.g., methyl alcohol and diluted to appropriate concentrations with deionized water are applied to the soil surface of respective containers of cucumber plants which in turn are returned to the greenhouse.

Two days after treatment subject plants are placed among diseased (*Erysiphe cichoracearum*) cucumber plants, according to the pattern below, subjected to an initial spore shower by dusting with spores from diseased plants and then left undisturbed in place for approximately ten days. By this procedure treated plants are subjected to the cited initial spore shower as well as to continuing natural infection pressure from surrounding inoculum. Observations ten days after initial inoculation determine duration of effectiveness of treatments. Untreated controls will reflect 75 to 100 percent leaf area diseased at this time. Effectiveness of treatment is determined by direct comparison with untreated inoculated controls. Benlate is used as a reference standard. All units of test include a minimum of three replicates.

LIQUID BAIT TEST PROCEDURE FOR INSECTICIDAL ACTIVITY AGAINST THE BOLL WEEVIL, Anthonomus grandis Candidate compound is prepared as an acetone-deionized water or wettable powder-based aqueous formulation containing 10 percent (W:V) dissolved granular sugar. One milliliter, expressed in ppm active ingredient, is pipetted onto a 9 cm filter paper in a 9 cm petri dish. Five (5) Boll Weevil adults are introduced and the petri dish cover affixed.

Observations are made for speed of knowkdown and for 72 hour mortality. Mortality induced may be by contact, ingestion or fumigant action.

TEST PROCEDURE AGAINST YELLOW FEVER MOSQUITO LARVAE, Aedes aegyptii, In Vitro Eggs of *Aedes aegyptii* will hatch within 24 hours when placed in a solution of 5 gm dextrose and 0.8 gms USP XIV salt/2000 ml $H_2O$. Approximately 60 percent of the eggs can be expected to hatch at any one time. Larvae are transferred to enameled trays and placed in an incubator at 80°F. Approximately 250 larvae are held in a 9 × 50 inch tray. The larvae are fed a pinch of the following after it has been ground in a mortar with water to give a slurry: 50 gm Brewer's yeast, 15 gm blood albumin, and 10 gm sucrose. In approximately 7 days, larvae will have reached the 4th instar and are ready for testing.

Ten (10) milligrams of candidate compound in one (1) ml analytical reagent grade acetone are brough to volume by addition of 99 ml deionized water. Dilutions, as required, are made with deionized water.

Aliquots of 25 ml per dosage are placed in test tubes, three replicates per dosage, from 10 to 25 4th instar larvae added, held at 70°F in darkness for 72 hours and then observed for percentage mortality.

DDT at 0.0010 ppm will normally induce 100 percent mortality in 24 to 48 hours.

Acetone is generally not toxic up to concentrations of 10,000 ppm.

The N-halo compounds of Examples 2 and 3 were tested as fungicides and insecticides with the results set forth below in Tables I and II infra.

TABLE I

FUNGICIDAL ACTIVITY

| N-Halo Compound | lbs/acre | % Disease Control: | Plant Injury* |
|---|---|---|---|
| A. Soil Fungicidal Activity | | | |
| Example 2 | 25 | Scleroti rolfsi | 60 (no plants) |
| B. Systemic Fungicidal Activity | | | |
| Example 2 | 10 | Leaf rust wheat | 57:0 |

TABLE I-continued

FUNGICIDAL ACTIVITY

| N-Halo Compound | lbs/acre | % Disease Control: Plant Injury* | |
|---|---|---|---|
| C. Protectant Foliar Fungicidal Activity | | | |
| Example 2 | ½ | Late Blight Tomato | 84:0 |
| | | Rice Blast Disease | 42:0 |
| | | Leaf Rust Wheat | 99:0 |

* Plant injury is rated on a 0-10 scale, 0 denoting no injury and 10, phytotoxicity.

TABLE II

INSECTICIDAL ACTIVITY INSECT GROWTH REGULANT

| Compound | Concentration | Efficacy |
|---|---|---|
| Example 3 | 25 ppm | Yellow fever mosquito larvae (in vitro) 60% (ovicidal) |
| Example 3 | 25 ppm | Yellow fever mosquito (in vitro) 100% (supermolt) |
| Example 2 | 600 ppm | Boll Weevil - Bait procedure, 93% (ovicidal) |
| Example 2 | 25 ppm | Yellow fever mosquito larvae (in vitro) 100% (ovicidal) |
| Example 2 | 600 ppm | Boll Weevil modified topical procedure 100% (mortality) |
| Example 2 | 600 ppm | Milkweed Bug - modified topical procedure 95% (no molt) |
| Example 2 | 25 ppm | Yellow fever mosquito (in vitro) 100% (mortality) |

What is claimed is:

1. A method of destroying pests selected from the group consisting of fungi and insects comprising applying to said pest a biocidally effective amount of an N-halo compound of the formula:

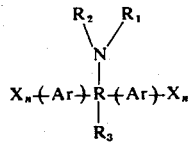

where R is an aliphatic hydrocarbon group of 1 to 20 carbon atoms, Ar is a mono or polyaromatic hydrocarbon ring, $R_1$ is chlorine or bromine, $R_2$ is hydrogen, chlorine, bromine or alkyl, $R_3$ is hydrogen, alkyl or haloalkyl, X is halogen, and $n$ is an integer of 0 to 3.

2. A method according to claim 1, wherein Ar is phenyl, alkylphenyl having 1 to 5 carbon atoms in the alkyl group, naphthyl or biphenyl, $R_1$ is chlorine or bromine, $R_2$ is hydrogen, chlorine, bromine or alkyl of 1 to 20 carbon atoms, $R_3$ is hydrogen, alkyl of 1 to 20 carbon atoms or haloalkyl of 1 to 20 carbon atoms wherein the halogen is chlorine and X is chlorine, bromine or fluorine.

3. A method according to claim 2 wherein $R_1$ is chlorine.

4. A method according to claim 3 wherein $R_2$ is chlorine.

5. A method according to claim 3 wherein Ar is phenyl, $R_2$ is hydrogen, chlorine or alkyl of 1 to 4 carbon atoms, $R_3$ is hydrogen, alkyl of 1 to 4 carbon atoms, or haloalkyl of 1 to 4 carbon atoms wherein the halogen is chlorine, and X is chlorine.

6. A method according to claim 5 wherein $R_2$ is chlorine.

7. A method according to claim 6 wherein $R_3$ is hydrogen.

8. A method according to claim 7 wherein $n$ is 0.

9. A method according to claim 7 wherein $n$ is 1.

10. A method according to claim 9 wherein X is in the para position.

11. A method according to claim 2 wherein $R_3$ is hydrogen.

12. A method according to claim 1 wherein the pests are insects and the N-halo compound is applied in an insecticidally effective amount.

13. A method according to claim 1 wherein the pests are fungi and the N-halo compound is applied in a fungicially effective amount.

14. A method according to claim 13 comprising applying the N-halo compound to plants infested with the fungi.

15. A method according to claim 1 wherein $R_3$ is hydrogen, alkyl or chloroalkyl and R is a saturated aliphatic hydrocarbon group.

16. A method according to claim 1 wherein the N-halo compound is N,N-dichloroaminodiphenylmethane.

17. A method according to claim 1 wherein the N-halo compound is N,N-dichloro-4,4'-dichloroaminodiphenylmethane.

18. A method according to claim 15 wherein Ar is phenyl, alkylphenyl having 1 to 4 carbon atoms in the alkyl group naphthyl or biphenyl and $n$ is an integer from 0 to 2.

* * * * *